(12) United States Patent
Moukharski et al.

(10) Patent No.: US 10,018,489 B2
(45) Date of Patent: Jul. 10, 2018

(54) MINIATURE DIFFERENTIAL PRESSURE FLOW SENSOR

(71) Applicant: COMMISSARIAT A L'ENERGIE ATOMIQUE ET AUX ENERGIES ALTERNATIVES, Paris (FR)

(72) Inventors: Iouri Moukharski, Briis sous Forges (FR); Alan Braslau, Paris (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 75 days.

(21) Appl. No.: 15/198,000

(22) Filed: Jun. 30, 2016

(65) Prior Publication Data

US 2017/0003152 A1    Jan. 5, 2017

(30) Foreign Application Priority Data

Jun. 30, 2015 (EP) ..................................... 15306054

(51) Int. Cl.
*G01F 1/46* (2006.01)
*G01F 1/38* (2006.01)
*G01P 5/165* (2006.01)

(52) U.S. Cl.
CPC ................ *G01F 1/383* (2013.01); *G01F 1/46* (2013.01); *G01P 5/165* (2013.01)

(58) Field of Classification Search
CPC ... G01F 1/46; G01F 1/383; G01L 7/08; G01L 9/00
See application file for complete search history.

(56) References Cited

U.S. PATENT DOCUMENTS

| | | | | | |
|---|---|---|---|---|---|
| 4,903,532 A | * | 2/1990 | Tamai | ................... | G01L 9/0042 73/718 |
| 5,174,158 A | * | 12/1992 | Kremidas | ............. | G01L 9/0051 338/4 |

(Continued)

FOREIGN PATENT DOCUMENTS

DE    197 81 747 T1    9/1999

OTHER PUBLICATIONS

Extended European Search Report as issued in European Patent Application No. 15306054.6, dated Dec. 15, 2015.

(Continued)

*Primary Examiner* — Jewel V Dowtin
(74) *Attorney, Agent, or Firm* — Pillsbury Winthrop Shaw Pittman LLP

(57) ABSTRACT

A fluid flow velocity sensor using a differential pressure measurement includes a stack having a tip pointing in a first direction, the stack including first and second plates arranged in parallel one another along the first direction; and a pressure-sensitive diaphragm arranged between the first and second plates along the first direction, the pressure-sensitive diaphragm being spaced apart from the first plate by a first cavity and from the second plate by a second cavity. The first cavity is entirely sealed, except at the tip of the stack, so as to be under a stagnation pressure during operation of the fluid flow velocity sensor. The second cavity is opened so as to be under a reference pressure during operation of the fluid flow velocity sensor. The fluid flow velocity sensor includes a detector to measure a parameter representative of the differential pressure between the first and the second cavities.

19 Claims, 3 Drawing Sheets

(56) References Cited

U.S. PATENT DOCUMENTS

| | | | | |
|---|---|---|---|---|
| 5,224,384 A * | 7/1993 | Kremidas | ............ | G01L 9/0051 |
| | | | | 338/4 |
| 5,317,920 A * | 6/1994 | Kremidas | ............ | G01L 9/0051 |
| | | | | 338/4 |
| 5,438,880 A * | 8/1995 | Washburn | ................ | G01P 5/16 |
| | | | | 73/718 |
| 7,389,686 B2 * | 6/2008 | Thomas | ................ | G01P 5/165 |
| | | | | 73/170.02 |
| 7,806,001 B1 * | 10/2010 | Shaw | .................. | G01L 9/0055 |
| | | | | 73/715 |
| 9,562,796 B2 * | 2/2017 | Lull | ........................ | G01F 1/48 |
| 9,574,960 B2 * | 2/2017 | Ned | ......................... | G01P 5/16 |
| 2005/0081638 A1 * | 4/2005 | Couch | .................. | G01L 9/0042 |
| | | | | 73/716 |
| 2013/0008263 A1 | 1/2013 | Kabasawa et al. | | |

OTHER PUBLICATIONS

Salort, J., et al., "Turbulent velocity spectra in superfluid flows," Physics of Fluids, American Institute of Physics, vol. 22, No. 12, 13 Dec. 2010, ISSN: 1070-6631, pp. 125102-1-125102-9.

* cited by examiner

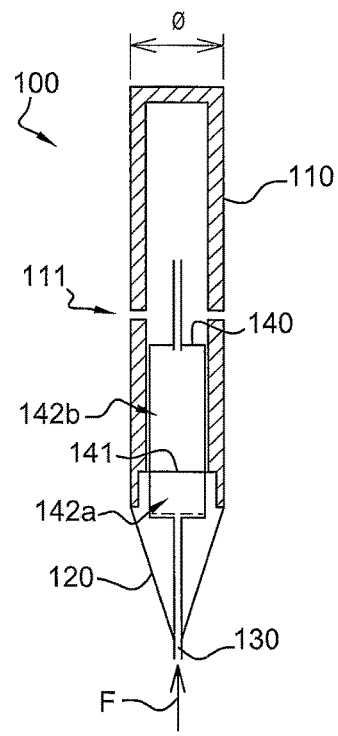
Fig. 1
(Prior Art)
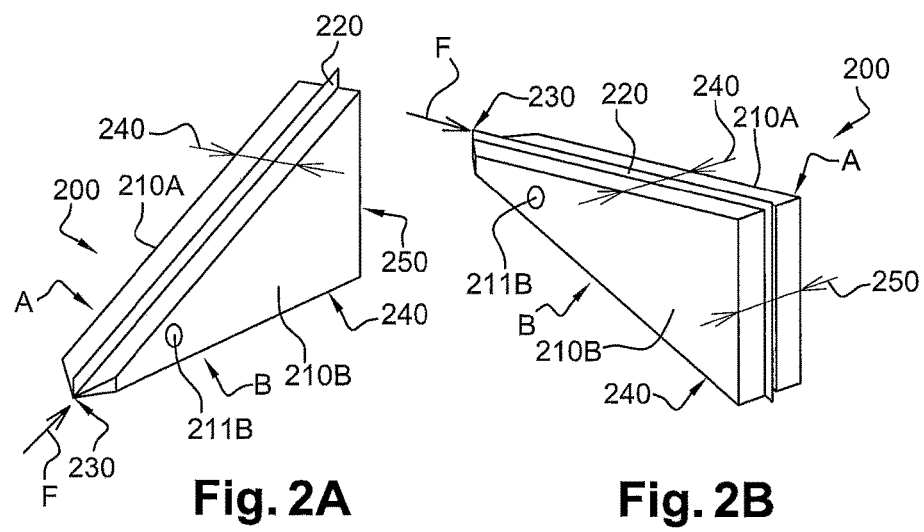
Fig. 2A  Fig. 2B

US 10,018,489 B2

MINIATURE DIFFERENTIAL PRESSURE FLOW SENSOR

CROSS-REFERENCE TO RELATED APPLICATIONS

This application claims priority to European Patent Application No. 15306054.6, filed Jun. 30, 2015, the entire content of which is incorporated herein by reference in its entirety.

FIELD

The present invention relates to devices for measuring fluid flow velocity based on a differential pressure method, and more specifically to a miniature fluid flow sensor that is suited for the measurement of superfluid turbulence.

BACKGROUND

One of the most important devices for measuring fluid flow velocity is the Pitot tube. Such devices, in various forms, are frequently used in industrial processes for monitoring gases and liquids flowing into pipes or conduits. Another important application of Pitot tubes is the measurement of the air speed of an aircraft and the water speed of a vessel.

A simple configuration of Pitot tube, called Pitot-static tube, is L-shaped and comprises two coaxial tubes. The inner tube has an opening, called stagnation port, which faces the fluid flow and senses the stagnation pressure (or total pressure) of the fluid. The outer tube has pressure sampling holes on its sides to measure the static pressure (or reference pressure). Both the stagnation tube and static tube have tubing connections at the top of the Pitot tube. A manometer is connected to the tubing connections to measure the difference between stagnation and static pressures, that is the dynamic pressure. Velocity of the fluid can then be determined from the dynamic pressure and the known fluid density, using the Bernoulli relation.

The Pitot tubes presently used in aeronautics are not miniaturized, although it would be desirable in the development of smaller unmanned aircraft or drones. Miniature Pitot tubes are however employed in wind tunnels and in water tanks for the measurement of the turbulence of a fluid as well as in liquid helium, both in normal fluid state and the superfluid state. Indeed, the physics of superfluid turbulence requires a measurement of fluid motion on a microscopic length scale, thus calling for an extreme miniaturization of the Pitot tubes.

In the document ["Turbulent velocity spectra in superfluid flows", Physics of fluid 22, 125102, 2010], J. Salort et al. disclose a stagnation pressure probe operating like a Pitot tube for the measurement of the turbulence in a cryogenic helium flow. Contrary to other types of flow sensor, this probe works both above and below the superfluid transition temperature of helium ($T_\lambda$=2.17 K).

FIG. 1 schematically represents the stagnation pressure probe 100 disclosed in the above-mentioned document. The probe 100 comprises a cupronickel outer tube 110 and a conical-shaped nozzle 120, mounted on one end of the outer tube 110. The tip of the nozzle 120 is formed by the end of a cupronickel capillary tube 130 extending through the nozzle 120 in the direction of the flow, designated by the arrow "F". The sub-millimetric diameter of the capillary tube 130 allows superfluid turbulence to be measured. The nozzle 120 adapts the small diameter of the capillary tube 130 to the larger diameter $\phi$ of the outer tube 110 ($\phi$=3.5 mm), thus reducing the disturbances of the helium flow.

As shown in FIG. 1, a commercial cryogenic pressure transducer 140 is enclosed in the outer tube 110 of the probe. It comprises a diaphragm 141, on which a piezoresistive gauge is disposed (not shown). The diaphragm 141 extends in a plane perpendicular to the axis of the outer tube 110, i.e. perpendicular to the direction of the fluid flow F, and separates a first cavity 142a from a second cavity 142b. The first cavity 142a is connected to the stagnation port of the probe, i.e. the tip of the nozzle 120, through the capillary tube 130. The second cavity 142b is open to the rear of the outer tube 110, where reference pressure is taken via holes 111 made in the outer tube 110. The piezoresistive gauge measures the deformation of the diaphragm 141, which is representative of the difference between the stagnation pressure in the first cavity 142a and the reference pressure in the second cavity 142b.

The pressure probe 100 of FIG. 1 has problems of robustness, because the (silicon-based) diaphragm 141 needs to be very flexible in order to achieve reasonable sensitivity and may break in extreme conditions, especially for large flow velocity or upon cryogenic cool-down. Furthermore, the volume between the tip of the nozzle 120 and the diaphragm 141 constitutes a dead volume that increases the response time of the probe. As a result, the pressure probe has a limited frequency response.

Finally, the sensibility of the pressure probe 100 is low because the diaphragm 141 has a small area. Yet, increasing the diaphragm area is difficult, since it would increase the diameter $\phi$ of the outer tube 110 and, consequently, the invasiveness of the probe with respect to the fluid flow. Increasing the diameter of the diaphragm and the outer tube would also increase the dead volume corresponding to the first cavity 6a, further limiting the frequency response of the probe.

SUMMARY

There is therefore a need to provide a miniature fluid flow velocity sensor which is robust and has an improved sensitivity.

According to a first aspect of the invention, this need is satisfied by providing a fluid flow velocity sensor using a differential pressure measurement and comprising:
  a stack having a tip pointing in a first direction, the stack comprising:
    first and second plates arranged in parallel one another along the first direction; and
    a pressure-sensitive diaphragm arranged between the first and second plates along the first direction, the pressure-sensitive diaphragm being spaced apart from the first plate by a first cavity and from the second plate by a second cavity;
  wherein the first cavity is entirely sealed, except at the tip of the stack, so as to be under a stagnation pressure during operation of the fluid flow velocity sensor, and wherein the second cavity is opened so as to be under a reference pressure during operation of the fluid flow velocity sensor; and
  a detector configured to measure a parameter representative of the differential pressure between the first and the second cavities.

Contrary to the prior art pressure probe, the fluid flow velocity sensor according to the first aspect of the invention has a pressure-sensitive diaphragm that extends in the direction given by the tip of the sensor, i.e. in the direction of the fluid flow. This allows to increase the area of the diaphragm without increasing the invasiveness of the sensor with respect to the flow. The fluid flow velocity sensor has thus an improved sensitivity. Furthermore, since the diaphragm is located immediately adjacent to the tip of the stack (because it has substantially the same area as the side plates and extends up to the tip of the stack), where the stagnation pressure is applied, there is little dead volume. The fluid flow velocity sensor has then a short response time and therefore an extended frequency response. In other words, it is capable of measuring fast velocity variation of the fluid flow.

Besides, as the pressure-sensitive diaphragm is held in sandwich between the first and second plates, it is protected from damage due to transient over-pressures while still being sensitive to small (i.e. local) pressure changes.

According to a development of the fluid flow velocity sensor, the stack has at least two leading edges extending from the tip and one trailing edge, the first cavity is sealed along the at least two leading edges and one trailing edge of the stack, and the second cavity is sealed at the tip and along the leading edges of the stack.

In a first embodiment of the fluid flow velocity sensor, the pressure-sensitive diaphragm, the first plate and the second plate have a triangular shape, and the trailing edge connects the two leading edges of the stack.

In a second alternative embodiment, the stack comprises a triangular nose delimited by the two leading edges, and a rectangular body extending the nose in the first direction and delimited by two longitudinal edges and the trailing edge, the trailing edge connecting the two longitudinal edges.

According to a development of this second embodiment, the fluid flow velocity sensor further comprises:
a capillary sleeve surrounding the nose and a part of the body of the stack and having a flow inlet in front of the tip of the stack; and
a sealing material filling a dead volume between the capillary sleeve and the stack.

Any variation of the differential pressure across the pressure-sensitive diaphragm, i.e. the difference between the stagnation pressure and the reference pressure, causes a deformation of the diaphragm, which may be detected through a capacitive technique, for example. In an embodiment, the pressure-sensitive diaphragm is electrically conducting, the first and second plates have an electrically conductive inner surface and the detector comprises an electronic circuit for measuring a capacitance variation of the stack. Beneficially, for cryogenic use the pressure-sensitive diaphragm is made of brass and the first and second plates are made of stainless steel.

The circuit for measuring the capacitance variation of the stack may comprise a dual coil transformer to apply excitation signals of opposite phases on the first and second plates, and two preamplifier sensing a resulting voltage of the pressure-sensitive diaphragm and having cross-correlated outputs.

Alternatively, the deformation of the pressure-sensitive diaphragm may be detected by means of a thin-film strain gauge. Such thin-film strain gauge is arranged on the diaphragm and the detector comprises an electronic circuit for measuring a resistance variation of the thin-film strain gauge. Beneficially, again for cryogenic use the pressure-sensitive diaphragm comprises a polyimide film coated with at least one metallic resistive pattern and wherein the first and second plates are made of an aluminum alloy.

The electronic circuit for measuring the resistance variation of the thin-film strain gauge may comprise a Wheatstone bridge, wherein at least one resistor is formed by the at least one metallic resistive pattern, and two preamplifier sensing an output voltage of the Wheatstone bridge and having cross-correlated outputs.

The fluid flow velocity sensor according to the first aspect of the invention may also have one or more of the following characteristics, considered individually or according to any technically possible combinations thereof:
the second cavity is opened along the trailing edge of the stack;
the second cavity is opened through a static pressure hole formed in the second plate, the static pressure hole extending through the second plate in a second direction perpendicular to the first direction;
the pressure-sensitive diaphragm and the inner surfaces of the first and second plates are hydrophobic for use in an aqueous environment.
the first and second plates may have grooves on their inner surface, extending from the tip of the stack up to the length of the first and second plates.

A second aspect of the invention relates to a method for manufacturing a fluid flow velocity sensor. This method comprising the following steps:
forming a stack successively comprising a first plate, a first sacrificial layer, a pressure-sensitive diaphragm, a second sacrificial layer and a second plate arranged in parallel to each other along a first direction, the stack having a tip pointing in the first direction, at least two leading edges extending from the tip and one trailing edge;
forming first and second tight seal along the two leading edges of the stack while keeping opened the tip of the stack between the pressure-sensitive diaphragm and the first plate;
removing the first and second sacrificial layers through the trailing edge of the stack; and
forming a third tight seal along the trailing edge of the stack between the pressure-sensitive diaphragm and the first plate.

The first and second sacrificial layers are beneficially made of PTFE.

Alternatively, the first and second sacrificial layers are first and second resin layers deposited on an inner surface of the first and second plates respectively.

BRIEF DESCRIPTION OF THE FIGURES

Others characteristics and benefits of the invention will become clear from the description that is given thereof below, by way of indication and in no way limiting, with reference to the appended figures, among which:
FIG. 1, as previously described, shows a pressure-based fluid flow velocity sensor according to the prior art;
FIGS. 2A and 2B are perspective views of a fluid flow velocity sensor according to a first embodiment of the invention.

For greater clarity, identical or similar elements are marked by identical reference signs in all of the figures.

DETAILED DESCRIPTION

Figure 3:
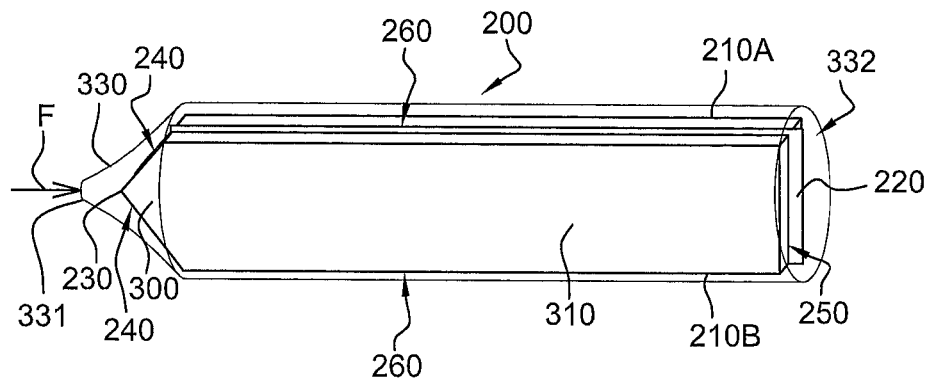
FIG. 3 is a perspective view of a fluid flow velocity sensor according to a second embodiment of the invention.

Like Pitot tubes, the miniature fluid flow velocity sensor of the invention is a differential pressure flowmeter. It measures the dynamic pressure, that is the difference between the stagnation pressure and the reference pressure, and then determines the fluid flow velocity from the dynamic pressure. However, its construction differs substantially from that of a conventional Pitot tube. Indeed, instead of being external in a separate pressure transducer, the pressure-sensitive diaphragm is an integral part of the sensor. This results in a much more compact construction than the conventional Pitot tube.

FIGS. 2A and 2B show a part of this miniature fluid flow velocity sensor, according to a first embodiment of the invention. This part is designated hereafter as the (stagnation and reference) pressure probe.

The pressure probe comprises a stack 200 of three layers arranged in parallel to each other. The first and second outside layers of the stack 200 are rigid plates 210A and 210B forming the body of the probe. The first plate 210A and the second plate 210B are in an embodiment of the same size and mutually aligned. The third, inner layer consists in a flexible pressure-sensitive diaphragm 220. Diaphragm 220 is separated from the first plate 210A by a first gap and from the second plate 210B by a second gap. The first and second gaps are in an embodiment of the same thickness, comprised (depending on requirements on sensitivity and operating frequency) between 20 µm and 200 µm.

In this first embodiment, the stack 200 looks like the head of an arrow, because the plates 210A-210B and the diaphragm 220 have a triangular shape. The stack 200 then comprises a tip 230 (i.e. the tip of the arrowhead), two leading edges 240 extending from the tip 230 and one trailing edge 250 connecting the two leading edges 240. The leading edges 240 of the stack 200 are in an embodiment of the same length (stated otherwise, the triangles are isosceles). As shown in FIGS. 2A and 2B, the main apex of the triangular plates 210A-210B (opposite to the "base" 250) may be beveled to make the tip 230 finer.

During operation, the pressure probe is oriented so that the tip 230 of the stack 200 points in a direction opposite to the principal fluid flow (designated by the arrow F). The plates 210A-210B and the diaphragm 220 thus extend from the tip 230 in the flow direction. Thicknesses of the plates 210A-210B and of the diaphragm 220 are measured in the direction perpendicular to the flow direction.

Diaphragm 220 is attached to the plates 210A-210B along at least the two leading edges 240 of the stack, for example by means of epoxy resin beads (not shown) or other bonding. As represented, the diaphragm 220 may slightly extend beyond the boundaries of the plates 210A-210B, so that the epoxy resin beads surround the protruding parts of the diaphragm 220. Thus, the area of the diaphragm 220 covered by the epoxy resin is larger and fixing of the diaphragm 220 to the plates 210A-210B is greatly improved.

The gap between the diaphragm 220 and each of the plates 210A-210B defines a inner cavity. One cavity, called hereafter "stagnation cavity" and located on side A of the diaphragm 220, is configured to sense the stagnation pressure (or "total pressure") during operation of the sensor, whereas the other cavity, called "reference cavity" and located on the opposite side B of the diaphragm 220, is configured to sense the reference pressure (or "static pressure").

The stagnation cavity is entirely sealed, except in the vicinity of the tip 230. In this example, the sealing is achieved by the epoxy resin beads along the two leading edges 240 of the stack and by a third epoxy resin bead along the trailing edge 250 of the stack, between the first plate 210A and the diaphragm 220. The opening of the stagnation cavity at the tip 230 constitutes a stagnation point, where the fluid flow is stopped. This opening is for example circular or rectangular and its size (e.g. diameter) is in an embodiment comparable to the stagnation cavity thickness, i.e. comprised between 20 µm and 200 µm. A microscopic sensing orifice can then be obtained, allowing fluid velocity and turbulence measurements on a very short length-scale.

Like the stagnation cavity, the reference cavity is sealed along the leading edges 240 of the stack, in an embodiment, by using the same technique as for the stagnation cavity. The reference cavity is also sealed including the tip 230 of the stack 200. This prevents the fluid flow to directly enter the reference cavity. However, the reference cavity is opened in such a way that the reference pressure is taken. This can be done by opening the trailing edge 250 of the stack, between the second plate 210B and the diaphragm 220 (on the opposite side of the diaphragm 220, i.e. between the first plate 210A and the diaphragm 220, the trailing edge 250 is sealed). A variant consists in forming one (or more) static pressure hole(s) 211B on side "B" of the stack through the second plate 210B. In an embodiment, the hole 211B extends through the plate 210B in the thickness direction of the stack, perpendicularly to the fluid flow F.

It will be noted that the static pressure hole(s) 211B can also be used when the trailing edge 250 of the stack is left open between the second plate 210B and the diaphragm 220. This hole is beneficial because it reduces the distance between the stagnation point 230 and the point where the static reference pressure is taken. For this reason, it should be located as near as possible to the tip 230. Embodiments of the fluid flow velocity sensor comprising the static pressure hole on their side have then a better frequency response.

The sandwich construction of pressure probe allows a tuning of parameters to adapt the performances of the fluid flow velocity sensor to each particular application, for example for a particular fluid, to achieve a particular range of flow velocity, a desired length-scale of the measurement or a desired frequency response. These parameters are the stiffness of the diaphragm 220, the thickness of the gap separating the diaphragm 220 from each of the side plates 210A-210B, the acute angle at the main apex, the size of the sensing orifice, the sharpness of the tip 230, the length of the sensor along the direction of the fluid flow, and the choice of materials for the plates and the diaphragm. All these parameters contribute to the performances of the fluid flow velocity sensor.

For example, the size of the opening at the tip 230 will influence the length-scale of the velocity measurement, that is the spatial resolution of the sensor. A small opening allows local variation of the fluid flow to be detected. This is of the utmost importance for detecting flow turbulence. On the other hand, larger opening facilitates fluid flow, reduces its inertia and thus increases range of operating frequencies. For the detection of superfluid turbulence, the size of the opening is in an embodiment comprised between 20 µm and 200 µm.

FIG. 3 schematically represents the pressure probe of miniature fluid flow velocity sensor according to a second embodiment of the invention.

In this second embodiment, the stack 200 comprising the side plates 210A-210B and the pressure-sensitive diaphragm 220 has a substantially rectangular appearance. It comprises a short, obtuse-angle triangular nose 300 delimited by the two leading edges 240, and a rectangular body 310 extending the nose 300 in the direction of the fluid flow F. The tip 230 of the stack thus belongs to the nose 300. The body 310 is delimited by two longitudinal edges 260 (oriented in the flow direction) and by the trailing edge 250. The trailing edge 250 connects the two longitudinal edges 260 at the back of the stack (opposite to the tip 230).

This stack 200 is inserted inside a thin-walled capillary sleeve 330, in an embodiment made of glass. The capillary sleeve 330 has a flow inlet 331 facing the tip 331. The flow inlet 331 is much smaller than the part of the capillary sleeve surrounding the body 310. For example, the diameter of the sleeve 300 is about 100 µm at the flow inlet 331 and progressively increases to reach 2 mm around the body 310. The wall thickness of the sleeve 300 is for example of about 10 µm.

The empty, dead volume between the stack 200 and the capillary sleeve 300 is filled with a sealing material, for example epoxy, wax or vacuum grease. During the filling process, the flow inlet 331 of the capillary sleeve and the sensing orifice at the tip 230 of the stack are kept clear of the filling material, in an embodiment by the placement of a small diameter (e.g. 100 µm) wire. This wire is subsequently removed.

The sealing material and capillary sleeve 330 may surround a significant part of the stack 200, but not its trailing edge 250, since the reference pressure is taken from the opening at the reference side of the trailing edge 250.

This variant of the pressure probe is more complicated to manufacture and the thin-walled capillary sleeve adds a small hydrodynamic dead volume to the pressure probe (the volume between the inlet 331 and the tip 230). Consequently, the response frequency band may be narrower compared to the pressure probe of FIG. 2A-2B. However, the cylindrical geometry of the outside capillary sleeve 300 less disturbs the fluid flow than the planar pressure probe of FIG. 2A-2B. Furthermore, the symmetry of this variant yields a more homogeneous dependence of response to off-axial components of the fluid flow.

In both variants, the side plates 210A-210B may have grooves on the surface facing the pressure-sensitive diaphragm 220, extending from the tip of the nozzle into the plates up to the length of the plates and approaching the trailing and/or the longitudinal edges. These grooves facilitate the flow of the liquid in the cavity, reduce its' inertia and thus further increase maximum operating frequency of the sensor.

In addition to the pressure probe of FIGS. 2A-2B or FIG. 3, the fluid flow velocity sensor comprises a detector for measuring the deformation of the pressure-sensitive diaphragm 220 during operation of the sensor. The deformation of the pressure-sensitive diaphragm 220 is indeed representative of the dynamic pressure variation, i.e. the variation of the differential pressure between the stagnation cavity (on side "A") and the reference cavity (on side "B"). This deformation can be detected through a variety of techniques, for example capacitive, piezoresistive and optical.

In one embodiment of the fluid flow velocity sensor, the deformation of the diaphragm 220 is detected by means of a capacitive detector. This type of detector measures the variation of the capacitance of the stack, which is induced by the deformation of the diaphragm. This detection scheme is well adapted to the measurement of differential pressure at low temperature, in particular at cryogenic temperature, and is highly sensitive. As a consequence, it can be desirable for the measurement of turbulence in cryogenic helium, both in the normal state and in the superfluid state (respectively above and below the superfluid transition temperature of 2.17 K). More generally, it is desirable in cases where the fluid whose velocity is to be measured is non-conducting and does not present great variations of the dielectric constant under the range of operating conditions.

The diaphragm 220 and the inner surface of the side plates 210A-210B are, in this embodiment, electrically conducting. The diaphragm 220 and the plates 210A-210B may be metallic, or conducting surface layers may cover the inner surface of the plates 210A-210B and both sides of the diaphragm 220 (a combination of these solutions is also possible).

For example, the pressure-sensitive diaphragm 220 is comprised of a brass foil and the side plates 210A-210B are made of stainless steel. The differential contraction of these two materials upon cooling, from room temperature down to cryogenic temperatures, insured that the diaphragm remains under tension. This tensioning, as well as the thickness of the brass foil, determines the stiffness of the diaphragm 220.

Figure 4:
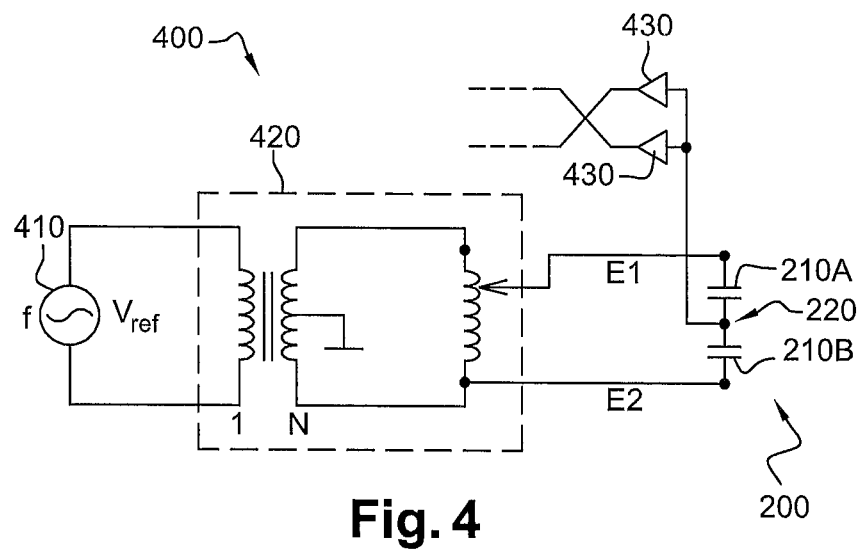
FIG. 4 is an electric diagram of a capacitive detection circuit that can be used to measure the differential pressure in the fluid flow velocity sensor of the invention.

The equivalent circuit diagram of the stack 200 then comprises dual capacitors connected in series (see FIG. 4). The first plate 210A and the diaphragm 220 are the electrodes (or terminals) of a first capacitor and the stagnation cavity (filled by the fluid) corresponds to the dielectric of the first capacitor. In the same way, the second plate 210B and the diaphragm 220 are the electrodes of a second capacitor and the reference cavity (also filled by the fluid) corresponds to the dielectric of the second capacitor. The measurement is thus differential.

The gap between the diaphragm 220 and each of the two side plates 210A-210B (as well as the dielectric constant of the fluid filling the gaps) and the surface area of the side plates determine the capacitance of the stack. As an example, the 25 µm-thick diaphragm 220 is spaced apart from the 1 mm-thick plates 210A-210B by gaps of 20 µm nominal thickness. The surface area of the triangular-shaped electrodes is about 0.25-1 $cm^2$. The resulting capacitance (at a fluid velocity of zero) is then about 14 pF.

FIG. 4 shows an example of a convenient detection circuit 400 for measuring the differential pressure across the diaphragm 220, through the variation of the stack capacitance, when the sensor is subjected to the fluid flow.

This capacitive detection circuit 400 comprises an AC power source 410 and a dual-coil audio transformer 420 connected to the AC power source 410. The dual coil transformer 420 generates from the power source signal $V_{ref}$ two excitations signals E1-E2 having the same frequency f than the power source signal, but substantially opposite phases. The excitations signals E1 and E2 are respectively applied to the sides plates 210A and 210B. The amplitude difference between these excitation signals is beneficially tuned to produce a null output in the static case of zero fluid velocity, thus allowing for the greatest dynamic range and sensitivity. The phase difference can be also tuned (around) 180° to compensate the slight difference in capacitance between the two sides at zero fluid velocity (due to an imperfection in the fabrication of the sensor) and a small phase shift due to losses and parasitic coupling (mostly capacitive).

The capacitive detection circuit 400 may also comprise two preamplifiers 430 connected with parallel inputs for amplifying the response signal of the sensor, here an unbalanced voltage on the diaphragm 220 caused by the diaphragm movement. The output signals of the preamplifiers 430 are in an embodiment cross-correlated to eliminate the noise introduced by the preamplifiers 430. The preamplifiers 430 are in an embodiment placed close to the pressure probe, in order to reduce losses caused by capacitive loads of the connecting cables and interference from external sources, such as power lines and neighbor sensors, induced in these cables.

In an alternative embodiment, a thin-film piezoresistive strain gauge is employed to detect the deformation of the diaphragm 220. For this second detection scheme, the side plates 210A-210B do not need to be electrically conducting. The strain gauge is arranged on the diaphragm or enclosed into the diaphragm. For example, the diaphragm 220 comprises a 20 µm-thick polyimide film coated with a 5 µm-thick resistive pattern made of a constantan copper-nickel alloy. Other piezoresistive techniques for measuring the strain are also possible.

Piezoresistive technique is beneficial when the liquid, whose velocity is measured is conductive or presents large variations of the dielectric constant, caused, for example by fluctuating density of chemical composition.

The strain gauge may comprise more than one resistive pattern. The pattern is beneficially designed and located to have optimal sensitivity according to the deformation mode of the diaphragm. It may be produced on the polyimide film by a standard evaporation technique followed by photolithography.

The stain gauge-based diaphragm 220 may be assembled with the side plates 210A-210B in same manner as the foil electrode of the capacitive detector. Here, the side plates 210A-210B are in an embodiment made of an aluminum alloy (rather than stainless steel) in order to insure the proper thermal contraction with respect to the polyimide-based diaphragm. Contrary to the capacitive detection scheme, the thickness of the gap does not influence the performance of the resistive detection. It is therefore a less critical parameter. As an example, 100 µm-thick gaps may be employed.

Figure 5:
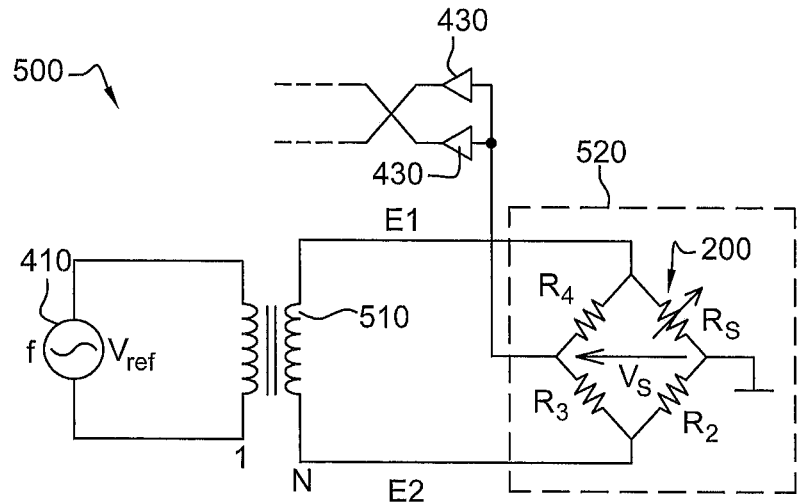
FIG. 5 is an electric diagram of a strain gauge-based detection circuit that can be used to measure the differential pressure in the fluid flow velocity sensor of the invention.

FIG. 5 schematically represents a resistive detection circuit 500 which may be used when the sensor includes a piezoresistive strain gauge.

The resistive detection circuit 500 comprises an AC power source 410 and a transformer 510 whose primary is connected to the power source 410. The secondary of the transformer 510 is connected to a load, which consists in a Wheatstone bridge 520. As shown in FIG. 5, the piezoresistive strain gauge arranged on the diaphragm 220 forms one of the resistors of the Wheatstone bridge 520. Its resistance is variable and referenced as "$R_S$" in FIG. 5. The other resistors of the Wheatstone bridge 520, R2 to $R_4$, are non-variable matching resistors. To obtain an accurate measurement of the flow velocity, the resistors R2 to $R_4$ are beneficially placed at the same temperature than the strain gauge.

When the piezoresistive strain gauge comprises several resistive patterns, the strain gauge may form several resistors of the Wheatstone bridge (and possibly all).

Like in the capacitive detection circuit 400, two preamplifier 430 may be used to sense the response signal of the detector, that is the output voltage $V_S$ of the Wheatstone bridge 520. The output signals of the two preamplifier 430 can also be cross-correlated in the resistive detection circuit 500.

In both the capacitive detection circuit 400 and the resistive detection circuit 500, synchronous detection is beneficially used. The excitation signals E1-E2 are modulated using a carrier signal at a predetermined frequency, for example of 10 kHz. Then, the (modulated) response signal and the carrier signal are fed to a digital lock-in amplifier. There, they are digitized using analog to digital converters and the response signal is demodulated numerically. This modulation/demodulation technique improves the signal to noise ratio.

The miniature fluid flow velocity sensor described above is well adapted for the measurement of helium turbulence velocities at extremely low temperatures. However, it can be also used in other fluid environments and/or at higher temperatures with similar benefits, by adapting their dimensions and their materials appropriately.

The capacitive embodiment of the sensor may not work properly when filled with a conducting fluid such as water. The resistive strain gauge is desirable in this case, as there is a risk of short circuit if the conductivity of the fluid is too high. An other solution would be to prevent the fluid from entering the sensor.

Since the sensing orifice is by design small and since the gaps are narrow, the fluid can be excluded from the cavities if the plates and the diaphragm are made of a non-wetting material, or if the materials of the plates and the diaphragm are treated to be non-wetting.

For use in water particularly, the pressure probe can be treated to be made hydrophobic. For example, the side plates of the stack can be made from glass and their inner surfaces covered with a hydrophobic silane layer. Alternatively, the side plates can be made from a fluorinated plastic material. When the sensor is then exposed to the water flow, a meniscus is formed at the openings of the probe and the fluid (for example air) inside the gaps of the probe serves as a pressure transmitting media. Such a hydrophobic treatment leads to new applications, as it will be discussed below.

This approach may also greatly increase the frequency range of the sensor due to much lower inertia of the air, compared to denser external fluid.

Another solution consists in filling the cavities with a non-soluable and non-conducting fluid, such as oil. The filling fluid may be retained in the cavities by capillarity or by other membranes (for example made by polymerization).

An important new application of this miniature Pitot tube-like sensor appears in the field of aeronautics. Thanks to the construction of the pressure probe, the sensing orifice can easily be kept from icing. Firstly, the probe can be treated to be hydrophobic as discussed above, thus passively preventing the condensation of water droplets and the nucleation of ice crystals in the cavities. Secondly, the sensor can be heated locally either through the operation of the resistive strain-gauge diaphragm or through the use of the intrinsic resistance of the side plates (or both). On the contrary, for cryogenic applications, care must be taken not to dissipate too much electrical energy in the resistive components, such as the stain gauge.

Similarly, in a marine environment, the pressure probe can be prevented from fouling (by marine growth) through the use of appropriate materials and surface treatment (such as fluorinated layers or polymers).

A method for manufacturing the pressure probe of FIGS. 2A-2B or FIG. 3 will now be described with reference to FIG. 6. This method uses sacrificial layers in an beneficial way to obtain uniform gaps on both sides of the pressure-sensitive diaphragm. These layers are referred to as "sacrificial" because they are intended to be removed, in an embodiment by etching, in order to form the stagnation cavity and the reference cavity of the pressure probe.

During a first step S1 of the method, the first plate 210A and the second plate 210B are arranged in parallel one another. In an embodiment of the method, the plates 210A-210B are glued to the jaws of a parallel vise using a weak glue, such as a cyanoacrylate adhesive or a sealing wax, while taking care that the plates are aligned. The use of a vise allows a precise assembly of the components of the stack. Beforehand, the plates 210A-210B may have been polished using emery paper, in order to obtain a smooth, flat inner surface.

At the following step S2, the pressure-sensitive diaphragm 220 is arranged in parallel to the plates 210A-210B. The vise is opened to allow placement and alignment of the diaphragm 220 between the plates 210A-210B.

The diaphragm 220 may be sandwiched between two sacrificial spacers. This sandwich assembly is then squeezed tightly together with the plates 210A-210B by means of the vise to insure a flat, parallel geometry. The spacers in this embodiment are made of PTFE (poly(1,1,2,2-tetrafluoroethylene)).

Alternatively, the inner surface of each plate 210A-210B may have been coated with a thin-film made of a sacrificial material, such as photoresist. The side plates 210A-210B covered by the photoresist thin-films are therefore pressed against the diaphragm 220.

At the end of step S2, the stack 200 successively comprising the first plate 210A, a first sacrificial layer (here made of PTFE or photoresist), the pressure-sensitive diaphragm 220, a second sacrificial layer (here made of PTFE or photoresist) and the second plate 210A is obtained (cf. FIGS. 2A-2B, 5).

At step S3, electrical wire leads are bonded to the inner diaphragm and eventually to the side plates (in case of a capacitive detection). The diaphragm may have been cut to extend at the back beyond the side plates, to make easier the bonding of the wires.

At step S4, the different layers of the stack are joined together. In this manufacturing method, this is obtained by forming tight seals along the two leading edges of the stack (and in an embodiment along the longitudinal edges of the body, in case of the probe of FIG. 3). The tight seals are in an embodiment formed of epoxy resin beads in contact with the diaphragm 220, the first plate 210A and the second plate 210B. After having gluing the stack with the epoxy resin, the stack (together with the vise) is placed in an oven to cure the epoxy resin (for example at 60° C.).

Beneficially, the diaphragm 220 was previously cut to be slightly larger than the side plates 210A-210B and the sacrificial layers, so that the protruding parts of the diaphragm 220 are enveloped within the epoxy resin beads. The sacrificial layers (PTFE spacer or the photoresist thin-films) not only fixe the thickness of the gaps between the diaphragm and the side plates but also prevent the epoxy resin from entering in the stack through capillarity and from filling these gaps. PTFE is desired because it does not adhere to the epoxy resin.

Thus, at step S4, the diaphragm 220 is glued to the plates 210A-210B by means of the epoxy resin beads along the leading edges of the stack. However, the sides plates 210A-210B and the diaphragm 220 can be bonded together using another technique than gluing, for example micro-soldering or brazing.

Then, the partially-sealed stack can be unglued from the jaws of the vise, for example using acetone in the case of cyanoacrylate adhesive.

Step S5 consists in removing the sacrificial layers (PTFE spacers or the photoresist thin films) via the left-open trailing edge of the stack, thus obtaining the stagnation cavity between the first plate 210A and the diaphragm 220, and the reference cavity between the second plate 210B and the diaphragm 220. This can be done by chemical etching, for example by using a bath of isopropyl alcohol or a strong base, depending on the chemical nature of the sacrificial layer.

Another alternative is to use aluminum as sacrificial layer and etch these layers with basic (NaOH or KOH, for example) or acidic etch.

Then, the tip of the stack is beneficially inspected under a microscope, to make sure that the tip is open to the stagnation cavity. The reference side of the tip, i.e. the part of the tip leading to the reference cavity and located between the diaphragm 220 and the second plate 210B, is then sealed (if it is not already the case). During sealing of the reference side of the tip, in an embodiment by a stud of epoxy resin, the stagnation side of the tip can be kept open through the passage of a wire, needle or fiber.

Finally, at step F6, at least the stagnation side of this trailing edge is sealed. This step can be easily performed by gluing the flap formed by the diaphragm at the back of the stack. The reference pressure side of the trailing edge may be also sealed, if a reference pressure hole is made in the side plate 210B. It is desirable to seal it when a side hole is provided very close to the tip, to insure that there is no flow through the reference hole.

For a cryogenic turbulence experiment, the arrowhead pressure probe of FIGS. 2A-2B may be mounted at the end of a hollow tube. For example, the probe is glued coaxially in a slot cut at the end of the hollow tube. One of the side plates may extend (in the form of a rectangle) beyond the others layers of the stack, thus allowing the mechanical mounting of the arrowhead probe in the slot of hollow tube. The hollow tube is in an embodiment of the same dimension as, or smaller than, the trailing edge of the stack.

Figure 6:
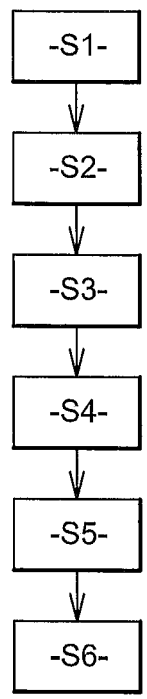
FIG. 6 is a flow chart depicting steps of a method for manufacturing a fluid flow velocity sensor.

Quality controls may follow the manufacturing method of FIG. 6. For example, the capacitance of both gaps or the continuity of the resistive strain gauge can be controlled using a LCR (inductance, capacitance, resistance) meter. The sensor may be tested again while being cooled to low temperature by plunging it into a liquid nitrogen bath. A thermal cycling between ambient and working temperatures is beneficial to increase to the reliability of the sensor.

Numerous variants of the fluid flow velocity sensor and of its manufacturing method may be envisaged by the person skilled in the art. In particular, other types of detector can be used for the measurement of the differential pressure. For example, a RF detection technique using deformable membranes engraved with a LRC circuit can be used. Alternatively, in one scheme for optical detection, the detector can comprises a laser light source (guided with an optic fiber) and a differential photodiode. Finally, the fluid flow velocity sensor of the invention is not limited to one of the particular shapes represented in FIGS. 2A-2B and 3.

The invention claimed is:

1. A fluid flow velocity sensor using a differential pressure measurement and comprising:
    a stack having a tip pointing in a first direction, said stack comprising:
        first and second plates arranged in parallel one another along the first direction; and
        a pressure-sensitive diaphragm arranged between the first and second plates along the first direction, said pressure-sensitive diaphragm being spaced apart from the first plate by a first cavity and from the second plate by a second cavity;

wherein the first cavity is entirely sealed, except at the tip of the stack, so as to be under a stagnation pressure during operation of the fluid flow velocity sensor, and wherein the second cavity is opened so as to be under a reference pressure during operation of the fluid flow velocity sensor;

wherein said pressure-sensitive diaphragm extends up to the tip of the stack, where the stagnation pressure is sensed; and a detector configured to measure a parameter representative of the differential pressure between the first and the second cavities.

2. The fluid flow velocity sensor according to claim 1, wherein the stack has at least two leading edges extending from the tip and a trailing edge, wherein the first cavity is sealed along said at least two leading edges and trailing edge of the stack, and wherein the second cavity is sealed at the tip and along the leading edges of the stack.

3. The fluid flow velocity sensor according to claim 2, wherein the first plate, the second plate and the pressure-sensitive diaphragm have a triangular shape, and wherein the trailing edge connects the two leading edges of the stack.

4. The fluid flow velocity sensor according to claim 2, wherein the stack comprises:
a triangular nose delimited by the two leading edges;
a rectangular body extending the nose in the first direction and delimited by two longitudinal edges and the trailing edge, the trailing edge connecting the two longitudinal edges.

5. The fluid flow velocity sensor according to claim 4, further comprising:
a capillary sleeve surrounding the nose and a part of the body of the stack and having a flow inlet in front of the tip of the stack; and
a sealing material filling a dead volume between the capillary sleeve and the stack.

6. The fluid flow velocity sensor according to claim 2, wherein the second cavity is opened along the trailing edge of the stack.

7. The fluid flow velocity sensor according to claim 1, wherein the second cavity is opened through a static pressure hole formed in the second plate.

8. The fluid flow velocity sensor according to claim 1, wherein the first and second plates have an electrically conductive inner surface and wherein the pressure-sensitive diaphragm is electrically conducting, the detector comprising an electronic circuit for measuring a capacitance variation of the stack.

9. The fluid flow velocity sensor according to claim 8, wherein the first and second plates are made of stainless steel and the pressure-sensitive diaphragm is made of brass.

10. The fluid flow velocity sensor according to claim 8, wherein the circuit for measuring the capacitance variation of the stack comprises a dual coil transformer configured to apply excitation signals of opposite phases on the first and second plates, and two preamplifier sensing a resulting electric potential of the pressure-sensitive diaphragm and having cross-correlated outputs.

11. The fluid flow velocity sensor according to claim 1, wherein the pressure-sensitive diaphragm comprises a thin-film strain gauge and the detector comprising an electronic circuit for measuring a resistance variation of the thin-film strain gauge.

12. The fluid flow velocity sensor according to claim 11, wherein the pressure-sensitive diaphragm comprises a polyimide film coated with a metallic resistive pattern and wherein the first and second plates are made of an aluminum alloy.

13. The fluid flow velocity sensor according to claim 11, wherein the electronic circuit measuring the resistance variation of the thin-film strain gauge comprises a Wheatstone bridge, the metallic resistive pattern forming one resistor of the Wheatstone bridge, and two preamplifier sensing an output voltage of the Wheatstone bridge and having cross-correlated outputs.

14. The fluid flow velocity sensor according to claim 1, wherein, the pressure-sensitive diaphragm and the inner surfaces of the first and second plates are hydrophobic.

15. The fluid flow velocity sensor according to claim 1, wherein the first and second plates have grooves on their inner surface, extending from the tip of the stack along the first and second plates in the first direction.

16. The fluid flow velocity sensor according to claim 1, wherein the pressure-sensitive diaphragm has substantially the same area as the first and second plates.

17. A method for manufacturing a fluid flow velocity sensor, comprising:
forming a stack successively comprising a first plate, a first sacrificial layer, a pressure-sensitive diaphragm, a second sacrificial layer and a second plate arranged in parallel to each other along a first direction, said stack having a tip pointing in the first direction, at least two leading edges extending from the tip and a trailing edge, said pressure-sensitive diaphragm extending up to the tip of the stack;
forming first and second tight seal along the two leading edges of the stack while keeping opened the tip of the stack between the pressure-sensitive diaphragm and the first plate;
removing the first and second sacrificial layers through the trailing edge of the stack; and
forming a third tight seal along the trailing edge of the stack between the pressure-sensitive diaphragm and the first plate.

18. The method according to claim 17, wherein the first and second sacrificial layers are made of PTFE.

19. The method according to claim 17, wherein the first and second sacrificial layers are first and second resin layers deposited on an inner surface of the first and second plates respectively.

* * * * *